United States Patent
Rouwet et al.

(10) Patent No.: US 9,811,367 B2
(45) Date of Patent: Nov. 7, 2017

(54) METHOD AND APPARATUS FOR COMBINED HARDWARE/SOFTWARE VM MIGRATION

(71) Applicants: Wim J. Rouwet, Austin, TX (US); Fares Bagh, Austin, TX (US)

(72) Inventors: Wim J. Rouwet, Austin, TX (US); Fares Bagh, Austin, TX (US)

(73) Assignee: NSP USA, Inc., Austin, TX (US)

( * ) Notice: Subject to any disclaimer, the term of this patent is extended or adjusted under 35 U.S.C. 154(b) by 65 days.

(21) Appl. No.: 14/540,741

(22) Filed: Nov. 13, 2014

(65) Prior Publication Data

US 2016/0139944 A1    May 19, 2016

(51) Int. Cl.
*G06F 9/455* (2006.01)

(52) U.S. Cl.
CPC .. *G06F 9/45558* (2013.01); *G06F 2009/4557* (2013.01)

(58) Field of Classification Search
CPC ............. G06F 9/45558; G06F 9/45533; G06F 2009/4557
USPC ............................................................ 718/1
See application file for complete search history.

(56) References Cited

U.S. PATENT DOCUMENTS

| | | | | |
|---|---|---|---|---|
| 6,795,966 B1* | 9/2004 | Lim | ..................... | G06F 11/1438 718/1 |
| 7,484,208 B1* | 1/2009 | Nelson | ................ | G06F 9/45558 711/6 |
| 7,788,665 B2* | 8/2010 | Oshins | .................. | G06F 9/4856 703/25 |
| 8,578,377 B2* | 11/2013 | Ge | .......................... | G06F 9/4856 718/1 |
| 8,751,738 B2* | 6/2014 | Green | .................... | G06F 3/0617 710/58 |
| 8,850,430 B2* | 9/2014 | Hayward | ................ | G06F 9/455 709/223 |
| 8,903,888 B1* | 12/2014 | Hyser | .................. | G06F 9/455 709/202 |
| 9,110,702 B2* | 8/2015 | Reuther | .............. | G06F 9/45558 |
| 2006/0005189 A1* | 1/2006 | Vega | ..................... | G06F 9/4856 718/1 |
| 2006/0225059 A1 | 10/2006 | Plaxton et al. | | |
| 2011/0161299 A1* | 6/2011 | Prahlad | .............. | G06F 17/30091 707/649 |
| 2012/0005678 A1* | 1/2012 | Ge | ........................ | G06F 9/4856 718/1 |

(Continued)

OTHER PUBLICATIONS

Clark et al. "Live migration of virtual machines", Proceeding NSDI'05 Proceedings of the 2nd conference on Symposium on Networked Systems Design & Implementation—vol. 2, pp. 273-286, May 2-4, 2005, USENIX Association Berkeley, CA, USA © 2005.*

*Primary Examiner* — Marina Lee

(57) ABSTRACT

A method and apparatus are provided for migrating one or more hardware devices (105) associated with a virtual machine (103) from a source machine (101) to a destination machine (111) by capturing, formatting, storing, and transferring hardware context information from the hardware device(s) at the source machine during the virtual machine migration process using a defined handshake protocol at each associated hardware driver (105) to capture the hardware context information from an associated hardware device (105) being migrated.

22 Claims, 6 Drawing Sheets

(56) References Cited

U.S. PATENT DOCUMENTS

| | | | |
|---|---|---|---|
| 2012/0017029 A1* | 1/2012 | Santos | G06F 12/1081 |
| | | | 711/6 |
| 2012/0320068 A1 | 12/2012 | Rose | |
| 2013/0086298 A1* | 4/2013 | Alanis | G06F 9/4856 |
| | | | 711/6 |
| 2013/0179883 A1* | 7/2013 | Hayward | G06F 9/455 |
| | | | 718/1 |
| 2013/0275708 A1 | 10/2013 | Doi | |
| 2014/0282520 A1 | 9/2014 | Sabharwal | |
| 2016/0139944 A1* | 5/2016 | Rouwet | G06F 9/45558 |
| | | | 718/1 |
| 2016/0210167 A1* | 7/2016 | Bolic | G06F 9/45558 |

* cited by examiner

METHOD AND APPARATUS FOR COMBINED HARDWARE/SOFTWARE VM MIGRATION

BACKGROUND OF THE INVENTION

Field of the Invention

The present invention is directed in general to a computer product, a computing device, and a data migration method for use with same. In one aspect, the present invention relates to a method, apparatus, system, and computer program product for migrating hardware-accelerated virtual machines from a source server device to a destination server device.

Description of the Related Art

With increasing processing speed and power, physical computers are able to execute one or more virtual machines (VM) which emulate the computer architecture and functionality of a real or hypothetical targeted computer, and their implementations may involve specialized hardware, software, or a combination of both. Depending on the degree to which they implement the functionality of a real or hypothetical targeted computer, a virtual machine provides an abstract and platform-independent substitute for the targeted computer. For example, Freescale's QorIQ™ communications platform P4 series processors provide a multicore processor architecture with high-performance datapath acceleration logic, where the processors may execute hypervisor software which allows cores to run different operating systems on multiple virtual machines or partitions, even on a single core.

For a variety of different reasons, a virtual machine running on the hardware of a first physical computer may be moved or copied to hardware on a second physical computer using a "migration" process whereby an operating system (OS) and application being executed by the virtual machine on the first physical computer hardware can be moved to the second physical computer hardware with little or no interruption or suspension of functionality. For example, live migration may be used to move a running virtual machine or application between different physical machines without disconnecting the client or application when maintenance work on one or the physical machines is done. While virtual machine migration is relatively straightforward when transferring software functionality (e.g., the processor and memory) of a virtual machine from the original host machine to a destination machine, such techniques are not well-suited for migrating specialized hardware which provides dedicated hardware functionality (e.g., fast path hardware offloads, such as encryption or packet processing acceleration hardware) that is used by the virtual machine at the host device. As a result, the existing solutions for correctly migrating virtual machines which use specialized hardware are extremely difficult or impossible at a practical level.

BRIEF DESCRIPTION OF THE DRAWINGS

The present invention may be understood, and its numerous objects, features and advantages obtained, when the following detailed description is considered in conjunction with the following drawings.

DETAILED DESCRIPTION

Figure 1:
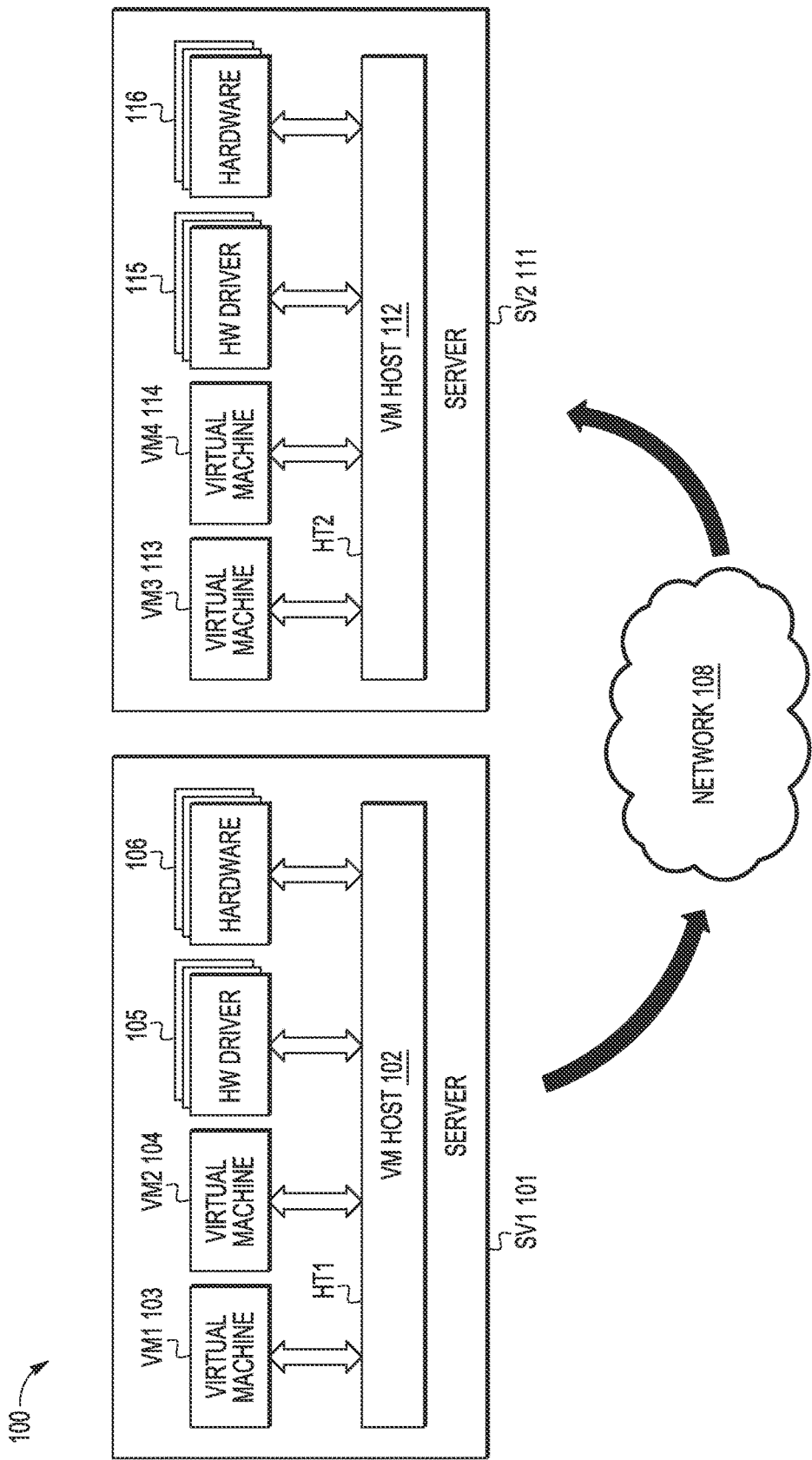
FIG. 1 illustrates a simplified block diagram of a server network system in which virtual machine migration is supported in accordance with selected embodiments of the present disclosure.

A software-triggered machine migration computer product, computing device, and methodology are described for migrating a dedicated hardware device used by a virtual machine to a new destination device by configuring driver software for the dedicated hardware device to capture hardware state context information to enable lossless state migration of the dedicated hardware device during migration of the virtual machine. In selected embodiments, the operation of a virtual machine migration process may be controlled to include a predetermined handshake protocol or application between the dedicated hardware device and its driver software to allow for software-triggered synchronized migration. In the handshake protocol, the driver software for the dedicated hardware device registers with a migration application during initialization to store identifying information for the dedicated hardware device and/or driver software, alone or in combination with virtual machine which uses the dedicated hardware device. The dedicated hardware device and associated driver software may then be used by an associated virtual machine during normal operation until such time as a virtual machine migration is triggered. Once migration of a virtual machine is triggered, a migration application executed at the VM host at a source machine identifies the registered dedicated hardware device(s) associated with the migrating virtual machine, waits for device operations for each registered dedicated hardware device to be completed, and then sequentially retrieves hardware state information for each identified the registered dedicated hardware device. Once the hardware state information is retrieved from the registered dedicated hardware device(s) used by the migrating virtual machine, conventional virtual machine migration processing may be performed at the VM host to migrate the virtual machine along with the retrieved hardware state information to the VM host at the destination machine, such as by using driver software instances at the source and destination machines to reformat the retrieved hardware state information and re-establish hardware context information at dedicated hardware device located at the destination machine.

In addition to supporting hardware-to-hardware migration, it will be appreciated that the migration techniques disclosed herein may also be used to migrate a dedicated hardware device at a source platform to a corresponding software module at a destination platform which implements the functionality of the dedicated hardware device by capturing and transferring hardware state context information from the dedicated hardware device. In addition or in the alternative, it will be appreciated that the migration techniques disclosed herein may also be used to migrate a software module (which implements hardware functionality at the source platform) to a hardware device at a destination platform by capturing and transferring required state context information from the software module.

Turning now to FIG. 1, there is shown a simplified block diagram of a server network system 100 in which virtual machine migration is supported in accordance with selected embodiments of the present disclosure. The network system 100 includes a server SV1 101 and a server SV2 111. The servers SV1, SV2 are connected across the network 108 to communicate with each other. The servers SV1, SV2 include VM hosts 102, 112, respectively, each of which is a computer processor hardware resource that may be partitioned or operated to establish multiple execution environments. The VM hosts 102, 112, may have the same architecture, or may have different architectures. For example, one VM host 102 may be an ARM processor architecture, while another VM host 112 may be an x86 architecture. In any case, each VM host 102, 112 is a physical server component (for example, a CPU, memory, and network I/F) which provides the underlying computer resources for executing software to support one or more guest virtual machines (VM) which virtualize computer hardware resources to operate under a specified execution environment. In the server network system 100, the VM host 102 can execute an application server within a first operating system using a first virtual machine VM1 103 and can simultaneously execute a database management system within a second operation system using a second virtual machine VM2 104 by operating the virtual machines 103, 104 under the execution environment that is built by the division of the hardware resources of the server SV1 101. In similar fashion, the VM host HT2 can run different operating systems by means of virtual machines VM3 113, VM4, 114 that operate under the execution environment that is built by the division of the hardware resources of the server SV2.

To virtualize computer hardware resources, each virtual machine includes software (e.g., a program and/or operating system), variables that are given to the software, and information that designates hardware resources for execution of the software. This enables a first VM host (e.g., 102) to run different operating systems with the virtual machines (e.g., VM1 to VM2), while a second VM host (e.g., 112) runs different operating systems with the virtual machines VM3 to VM4. To this end, the physical memory of each VM host (e.g., 102) may be organized and run as logical memory which in turn is organized and allocated to the guest virtual machines (e.g., VM1, VM2) so that each memory block in the logical memory of the virtual machine VM corresponds to one of the memory blocks in the physical memory of the VM host, and is used to store program content data for the virtual machine, such as programs (OS, application), images, and sounds.

As will be appreciated, each server 101, 111 may be implemented with one or more integrated circuit chips or as a single system on a chip (SOC) in which single core or multi-core processors in the computer processor hardware resources of the VM host execute hypervisor software which allows the core(s) to run different operating systems. A hypervisor is a low-level software program that facilitates secure partitioning by acting as the partitions' resources and security manager, presenting a virtual machine to the OS running in each partition. A hypervisor may manage multiple virtual machines and partitions, even on a single core, in a manner similar to how an operating system switches processes.

While virtual machines have conventionally been implemented entirely in software, there are certain computationally-intensive applications or operations (e.g., encryption, packet processing acceleration, etc.) which require substantial processing time when executed wholly in software with a conventional virtual machine approach. In such situations, speed may be improved by offloading such applications/operations to a dedicated hardware device or circuit which can evaluate the application/operation more quickly. For example, each server 101, 111 may include one or more dedicated hardware devices 106, 116 and associated HW driver software 105, 115 that is connected to, or included in, the computer processor hardware resources of the VM host 102, 112. Examples of such hardware include high-performance datapath acceleration logic, security-key based encryption logic, graphics acceleration logic, etc. By providing dedicated hardware devices 106, 116 to accelerate the processing of computationally-intensive applications or operations, overall system performance of the servers 101, 111 is improved.

Virtualized environments have been deployed to compose an application solution by aggregating different interdependent applications in different VMs. For instance, an application server can execute within a first VM1 103 while a database management system can execute in a second different VM2 104 and further while a Web server can execute in a third different VM3 113. Each VM1-3 can be communicatively coupled to one another in a network system 100 using a communication network 108. In addition, any one of deployed VM machine applications can be migrated to a different deployment without interfering with the execution of the other applications in the other VMs. In a typical live migration, a virtual machine VM running on a server (e.g., SV1 101) may be migrated over the network system 108 to another server (e.g., SV2 111) using a VM migration or live migration process. In live migration, the content of the memory at the source-side server (e.g., 101) that is allocated to the virtual machine being migrated (e.g., VM1) is copied to memory at the destination-side server (e.g., 111) where the virtual machine may be re-established.

As will be appreciated by those skilled in the art, conventional virtual machine migration techniques are well suited to move the logical memory and stored program content data of the source VM at the source server (e.g., 101) to the target or destination-side server (e.g., 111) where the target VM is re-established. However, virtual machine migration techniques have not, until now, been disclosed which support migration of one or more dedicated hardware devices (e.g., 106) and associated HW driver software (e.g., 105) between servers 101, 111. In contrast, selected embodiments of the present disclosure provide an efficient and low-cost software triggered mechanism for combining hardware and software mechanisms to capture both hardware and software state information at a source VM, and then transfer the captured information from the source VM to a target VM, thereby enhancing robust operation of the virtual machine server system.

As described more fully below, the disclosed virtual machine migration mechanism may include a defined machine migration component in each HW driver software component (e.g., 105) associated with any dedicated hardware device(s) 106 (e.g., HW accelerator) used by a VM at a source-side server (e.g., 101). The machine migration component may be configured to read and write hardware state or context information in the source or target virtual machine, and to be triggered during machine migration to capture (source), transfer (source→destination) and write (destination) the hardware state/context information. In particular, the machine migration component may include a registration process so that all HW driver software components 105 associated with the dedicated hardware device(s) 106 are registered during startup or initialization phase to define all contexts/states that need to be captured for the dedicated hardware device(s) 106 and associated drivers 105. In selected embodiments, the machine migration component may use an architecture-neutral language to capture the state during migration to allow for migration across HW implementation options. For example, type-length-value (TLV) encoding may be used to store the captured hardware state information.

Figure 2:
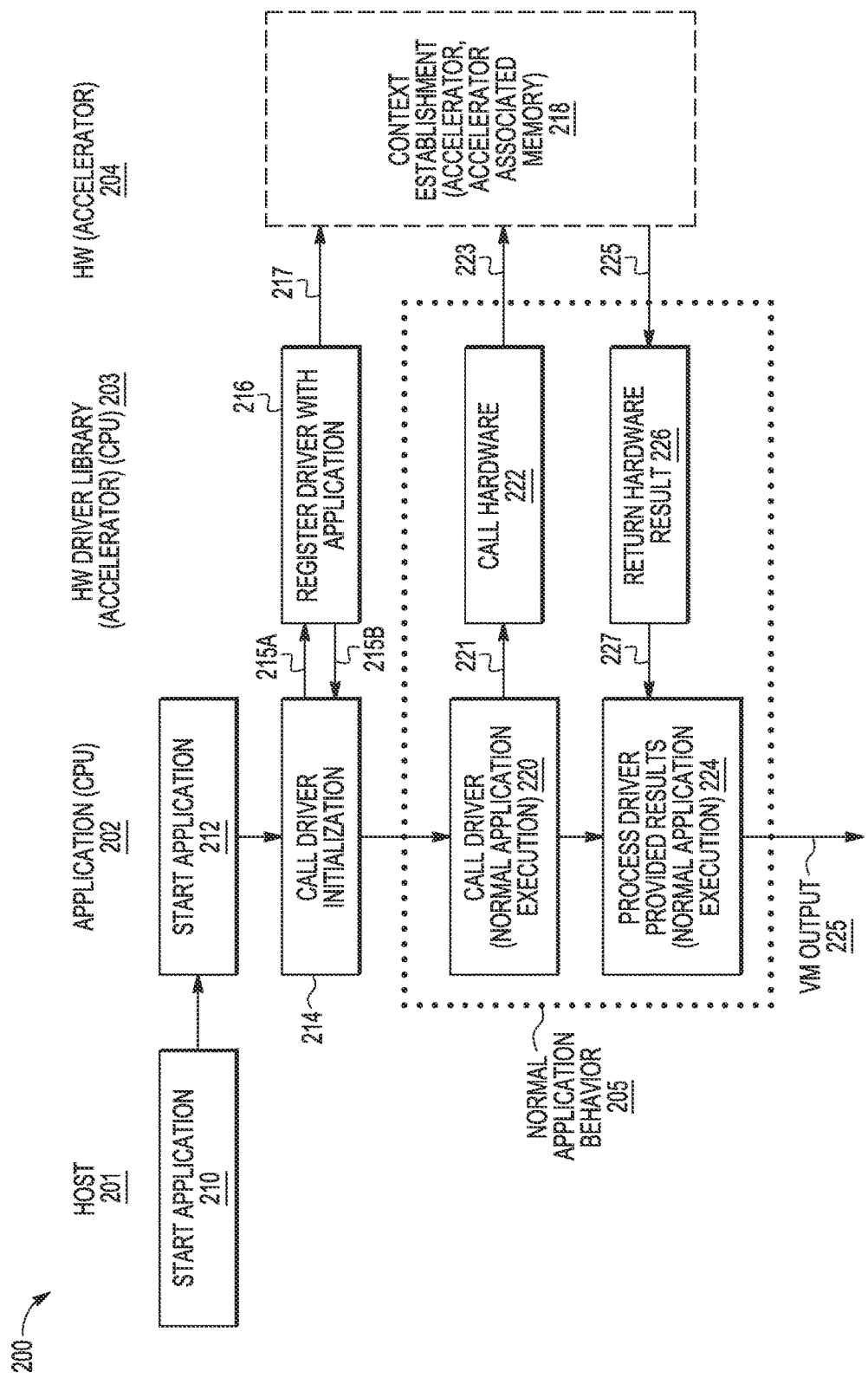
FIG. 2 illustrates a simplified block diagram of the functional operation of a VM application during initialization and normal VM operation at a source machine in accordance with selected embodiments of the present disclosure.

To provide additional context for selected example embodiments of the present disclosure, reference is now made to FIG. 2 which illustrates a simplified block diagram of the functional operation of a VM application 200 during initialization and normal VM operation at a source machine. As illustrated, the VM application 200 is started by the VM host 201 at block 210, and the functional execution is distributed across the application 202 executed at the host processor or CPU, the HW driver software component 203 (e.g., an accelerator driver) in the driver library, and dedicated hardware device 204 (e.g., accelerator). In particular, the VM application 202 startup is executed by the host processor/CPU at block 212. At any point during startup when a dedicated hardware device 204 is identified that is used by the VM application 200, a driver initialization call 215A is performed at block 214 for the identified HW driver software component 203. To make the HW driver software component 203 migration-aware, each driver is configured with a migration-aware component that registers the driver with the VM application 200, as indicated at block 216. In selected embodiments, the migration-aware component registers the driver with the migration host 201 along with predetermined migration control parameters for controlling migration of the dedicated hardware device 204.

During initialization or startup, the context for the dedicated hardware device 204 is configured or established at block 218, such as by loading initial state or context data 217 in the hardware (e.g., accelerator) and/or hard-associated memory (e.g., accelerator associated memory or registers). Once configured, the dedicated hardware device 204 may be used by the VM application 200 to perform the specified hardware function (e.g., acceleration) during normal operation 205 of the VM application 200. For example, during normal operation 205, the VM application 202 may invoke the dedicated hardware device 204 to perform the specified hardware function (e.g., acceleration) at block 220 by executing code at the CPU to call 221 the associated HW driver software component 203, which in turn executes code at the CPU at block 222 to call the associated dedicated hardware device 204 by providing execution parameters 223. In response, the dedicated hardware device 204 performs the specified hardware function based on the execution parameters 223 and returns computed hardware result(s) 225 to the associated HW driver software component 203, which in turn executes code at the CPU to return the hardware result(s) 227 to the VM application 202 at block 226. The VM application 202 may the execute code at the CPU to process the driver-provided hardware result(s) 227 at block 224, thereby generating VM output results 225.

Figure 3:
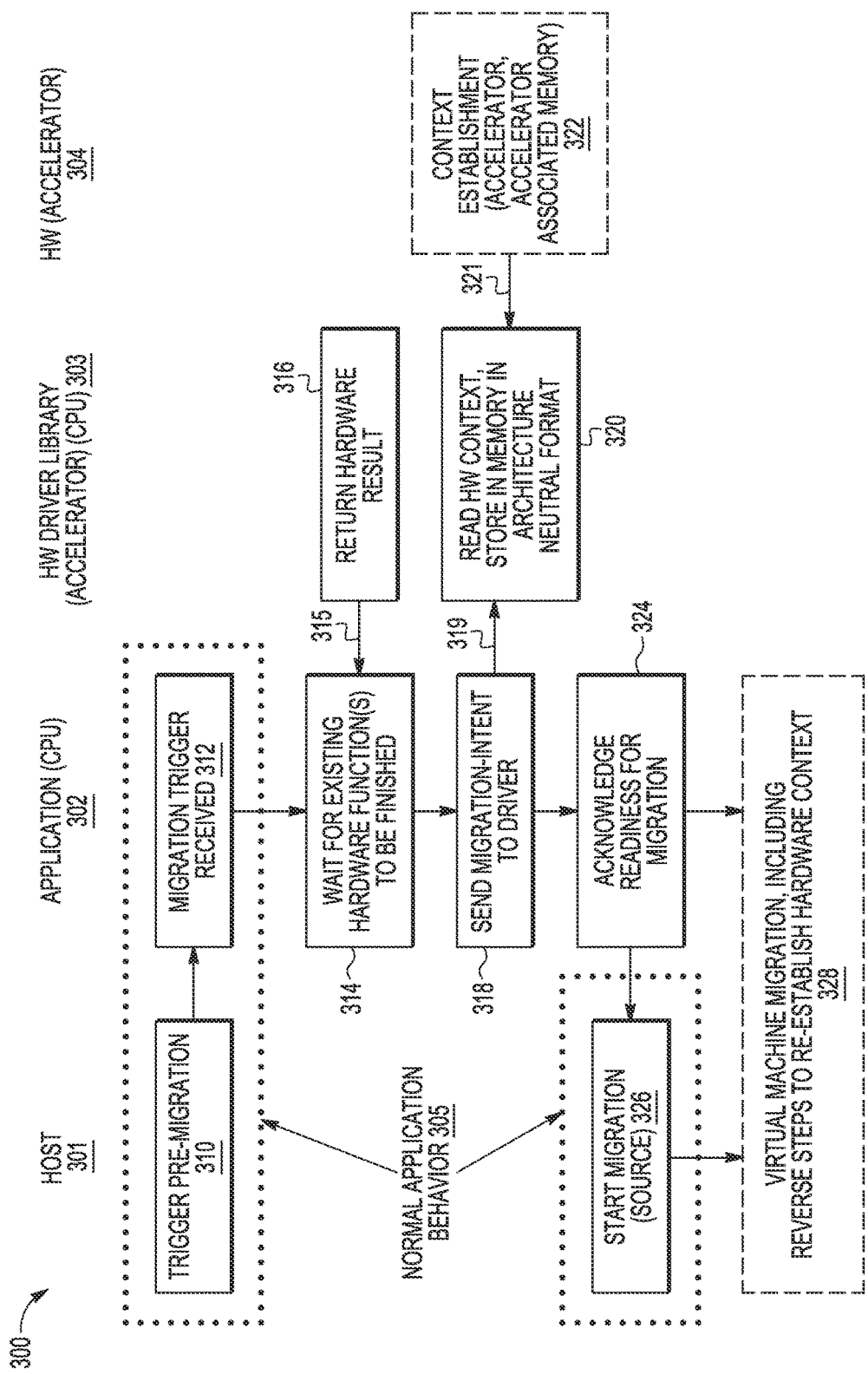
FIG. 3 illustrates a simplified block diagram of the functional operation of a VM migration application to collect hardware context information in addition to conventional machine migration data at a source machine in accordance with selected embodiments of the present disclosure.

To provide additional context for selected example embodiments of the present disclosure, reference is now made to FIG. 3 which illustrates a simplified block diagram of the functional operation of a VM migration application 300 to collect hardware context information for use in performing virtual machine migration at a source machine. As illustrated, the VM migration application 300 includes normal application processing steps 305 to migrate a virtual machine, including a pre-migration trigger step started by the VM host 301 at block 310 to send a migration trigger which is received at the VM application 302 at block 312. In addition, the normal application processing steps 305 start the VM migration at block 326 by executing code at the VM host 301 to begin migrating a source VM to a target VM. However, before starting VM migration, the VM migration application 300 uses a combination of hardware and software mechanisms to capture hardware context state information from each dedicated hardware device 304 (e.g., accelerator) which is registered as being used by the VM being migrated.

As a preliminary step to ensure a stable state for the capture of hardware context state information, the VM application 302 may response to the received migration trigger by executing code at the CPU to wait for all existing hardware functions to be finished at block 314, thereby allowing the HW driver software component 303 to return all pending hardware results 315 from block 316. Once all hardware results are received, the VM application 302 sends a migration-intent signal 319 at block 318 to one or more selected HW driver software components 303 that are associated with dedicated hardware device(s) 304 used by the migrating VM. As described herein, the migration-intent signals may be sequentially sent to selected HW driver software components 303 in a predetermined order or sequence so as to sequentially migrate the associated dedicated hardware device(s) 304 in turn. In response, each HW driver software component 303 retrieves hardware context state information 321 from the associated dedicated hardware device(s) 304 at block 322. Depending on the design and operation of the hardware device, the HW driver software component 303 will need to provide a mechanism to collect all relevant context state information. For example, if the dedicated hardware device 304 is an accelerator circuit, the retrieved hardware context state information 321 should include both static context state information (such as the iNIC MAC address) and dynamic context state information (such as the NPU lookup table(s)).

At block 320, the retrieved hardware context state information 321 may be processed when the HW driver software component 303 executes code at the CPU to format and store the retrieved hardware context state information in memory in an architecture-neutral format. Through an iterative process at block 320, the VM migration application 300 may sequentially cycle through a list of each dedicated hardware device 304 that is registered with the migrating VM to enable orderly machine migration for each dedicated hardware device(s) 304 so that all context state information relevant to the VM application function is stored, preferably in an architecture neutral format.

Once all of the context state information is retrieved and stored for the registered dedicated hardware device(s) 304, the VM migration application 300 may acknowledge that the hardware migration process is ready by executing code at the CPU to generate and send an ACK message to the VM host 301 at block 324, thereby enabling the normal application processing to start the VM migration at block 326. In addition or in the alternative, the VM migration application 300 may send the hardware migration ready acknowledge message directly to the virtual machine migration process which is executed by the VM host 301 and/or VM application 302 at block 328.

On the source-side server (e.g., 101), the source hypervisor controls the VM migration process to transfer software context state information for the VM being migrated along with hardware context state information for the associated dedicated hardware device(s) 304 being migrated. This process 328 for migrating both hardware and software state information may include assembling, for each VM being migrated, any associated dedicated hardware device(s) 304 being migrated therewith, migrating the hardware and software state information for the source virtual machines and associated dedicated hardware device(s) 304 to a target hypervisor, connecting the migrated virtual machines in the target hypervisor in same way as they were in the source hypervisor, and activating the target virtual machines and associated dedicated hardware device(s) 304 based on the hardware and software state information.

Figure 4:
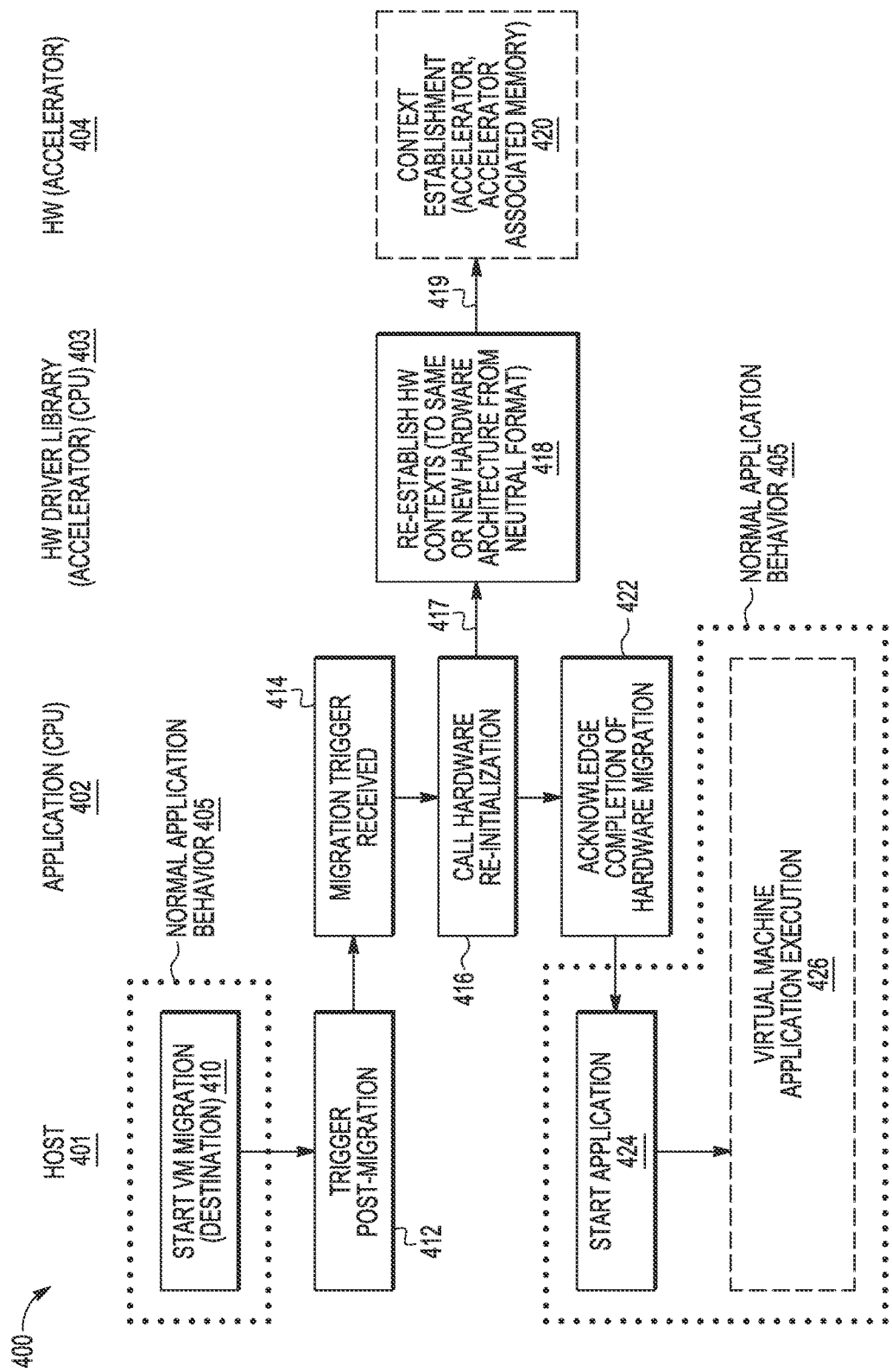
FIG. 4 illustrates a simplified block diagram of the functional operation of a VM migration re-establishment application to re-establish hardware context information at a destination machine in accordance with selected embodiments of the present disclosure.

To provide additional context for selected example embodiments of the present disclosure, reference is now made to FIG. 4 which illustrates a simplified block diagram of the functional operation of a VM migration re-establishment application 400 to re-establish hardware context information at a destination machine for use in performing virtual machine migration. As illustrated, the functional execution of the VM re-establishment application 400 is distributed across the VM host 401 and application 402 executed at the host processor or CPU, the HW driver software component 403 (e.g., an accelerator driver) in the driver library, and dedicated hardware device 404 (e.g., accelerator). In addition, the VM migration re-establishment application 400 may include normal application processing steps 405 to migrate a virtual machine to the destination-side server, including a migration start step started by the VM host 401 at block 410 to perform VM migration using code executed by the CPU at the VM host 401 and/or VM application 402.

Once started by the destination-side VM host 401 at block 410, the VM migration process may include any desired (existing or future) virtual machine migration process for transferring software functionality (e.g., the processor, memory state) of a virtual machine from the source-side server to the destination-side server. After the VM migration is completed, the VM migration re-establishment application 400 is executed by the host processor/CPU to trigger post-migration processing at the destination-side server or device at block 412.

Once the migration trigger is received at the application 402 (block 414), the VM application 402 executes code at the host processor/CPU at block 416 to issue a call 417 for the associated HW driver software component 403 to perform a hardware re-initialization process. In response, the associated HW driver software component 403 executes code at the CPU at block 418 to reboot or re-establish the hardware context state information that was captured from the dedicated hardware devices on the source-side server. At block 418, the captured hardware context state information may be retrieved from memory or buffered storage in an architecture-neutral format, and then formatted by the HW driver software component 403 into a new hardware architecture format for use by the dedicated hardware device 404. At this point, the initialization of the HW driver software component 403 at the destination-side server may include the installation and execution of a migration-aware component that registers the driver 403 with the VM host 401 and/or VM application 402 along with predetermined migration control parameters for controlling migration of the associated dedicated hardware device 404.

At block 420, the dedicated hardware device 404 receives the formatted hardware context state information 419 and establishes the context for the associated dedicated hardware device. Depending on the design and operation of the hardware device 404, the HW driver software component 403 will need all relevant context state information to re-establish the hardware context state information. For example, if the dedicated hardware device 404 is an accelerator circuit, the hardware context state information 419 should include static context state information (such as the iNIC MAC address) and dynamic context state information (such as the NPU lookup table(s)) that is formatted for the accelerator circuit. Through an iterative process at blocks 418 and 420, the VM migration re-establishment application 400 may sequentially cycle through a list of dedicated hardware devices 404 that are being migrated with the migrating VM to enable orderly machine migration so that all hardware context state information relevant to the VM application function is stored in the target architecture format.

Once the properly-formatted hardware context state information has been used to re-establish the hardware context for all dedicated hardware device(s) 404 being migrated, the VM migration re-establishment application 400 may acknowledge that the hardware migration process is completed by executing code at the CPU to generate and send an ACK message to the VM host 401 at block 422, thereby enabling the normal application processing to start the VM at block 424. Once started, the VM application is executed by the VM host 401 and/or VM application 402 at block 426 as part of the normal application behavior 405.

Figure 5:
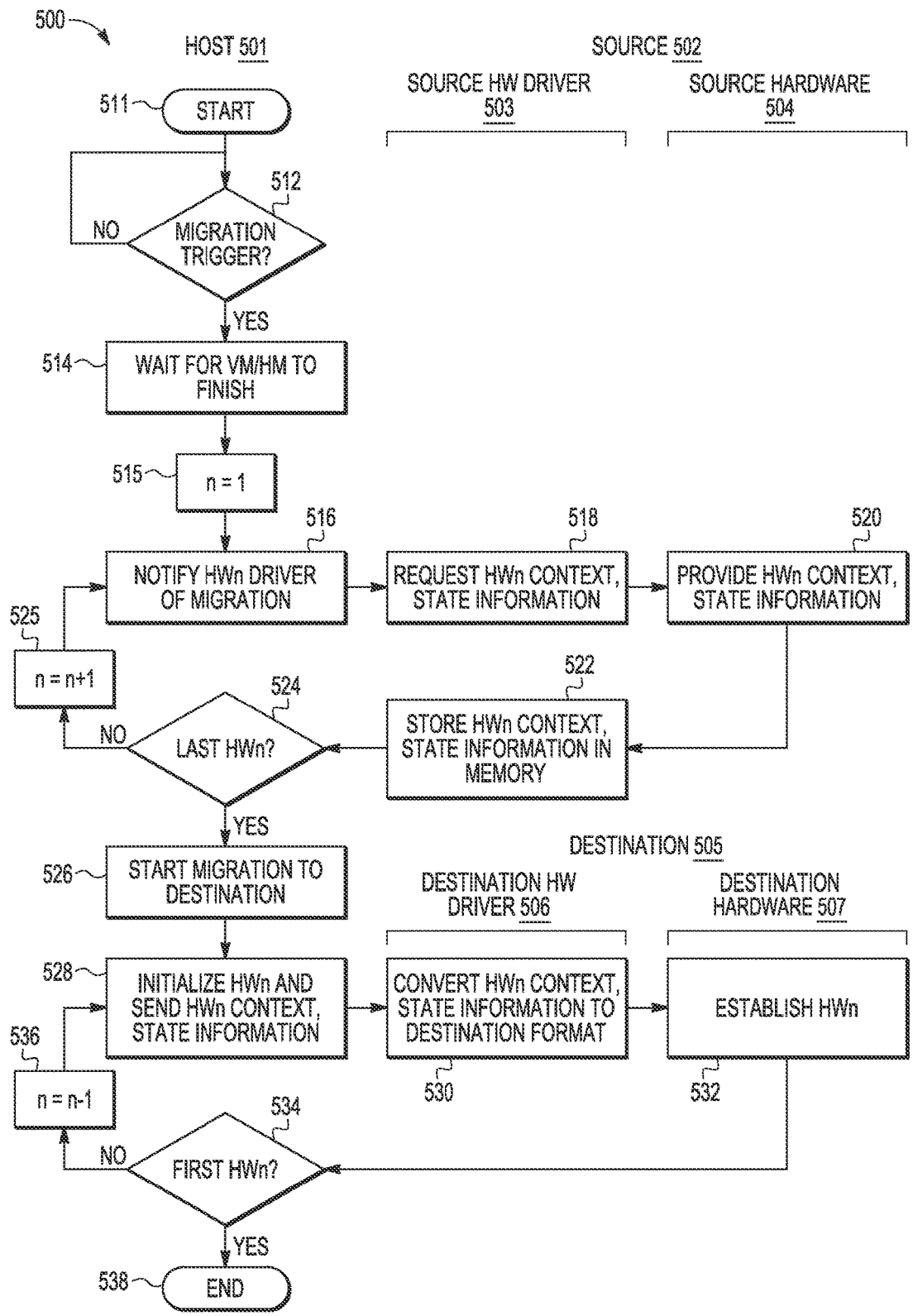
FIG. 5 illustrates a simplified flow chart of a method for migrating a dedicated hardware machine during virtual machine migration in accordance with selected embodiments of the present disclosure.

Referring now to FIG. 5, there is shown a simplified flow chart method 500 for migrating a dedicated hardware machine during virtual machine migration in accordance with selected embodiments of the present disclosure. When the migration process starts (step 511), processing steps performed at the host 501 detect whether a VM migration trigger has occurred at detection step 512. The trigger detection process may be configured with control logic at the host 501 which detects a virtual machine migration event, such as a maintenance event, load-balancing event, upgrade event or user-initiated migration event. In the absence of a migration trigger event (negative outcome to detection step 512), the migration process waits to detect a trigger. However, upon detecting a VM migration trigger event (affirmative outcome to detection step 512), the host 501 waits for any virtual machines and associated hardware devices to finish pending operations. For example, a single VM being migrated may have i hardware devices which are registered as being associated with the VM being migrated, where i is any positive integer value.

To provide an orderly sequencing of hardware migration operations, an incremented counter approach may be used to sequence through the i registered hardware devices. For example, control logic at the host 501 may initialize a first counter value n=1 at step 515 once the pending virtual machine and hardware device operations are finished. Using the counter value to select the nth hardware device from the list of i registered hardware devices associated with the VM being migrated, control logic at the host 510 may send a migration notification message at step 516 to the source-side server 502 which notifies the source-side hardware driver 503 for the selected hardware device (HWn) 504 that the selected hardware device (HWn) will be migrated. In selected embodiments, VM host 501 identifies which hardware devices (HWn) are associated with the VM being migrated using a list of registered hardware devices, where the registration process may be performed by configuring each hardware driver with a migration aware component that registers with the VM host 501 upon initialization of the hardware driver at the VM host 501. At the source-side hardware driver 503, control logic processes the received migration notification at step 518 to request or read hardware context and state information from the selected hardware device (HWn) 504. In response, the selected hardware device (HWn) 504 provides the requested hardware context and state information at step 520 for storage by the source-side hardware driver 503 for the selected hardware device (HWn) 504 at step 522. At step 522, all hardware state information from the selected hardware device (HWn) that is relevant to the VM application function may be stored in memory. In selected embodiments, the requested hardware context and state information may be stored in memory in an architecture-neutral format. Through an iterative process where control logic at the host 501 increments the counter n=n+1 at step 525 upon detecting that last hardware device has not been processed to retrieve hardware context and state information (negative outcome to detection step 524), the processing steps 516-522 are repeated until all hardware devices have been processed (affirmative outcome to detection step 524). In this way, the migration method 500 sequentially cycles through the list of registered hardware devices 504 being migrated to collect and store all hardware context and state information using an incremented counter to enable orderly machine migration for each hardware device.

At step 526, the source-side VM host 501 starts migrating the VM and the i registered hardware devices to the destination-side server 505 using any desired virtual machine migration process for transferring software functionality (e.g., the processor, memory, storage, and network connectivity) of a virtual machine from the source-side server to the destination-side server. After the VM migration is completed, control logic at the VM host 501 may provide an orderly sequencing of hardware migration to the destination by effectively reversing the machine migration steps with a decremented counter approach to sequence the migration of the i registered hardware devices. For example, using the counter value n which is set by virtue of the preceding steps 515-525, control logic at the host 501 may select and initialize the nth hardware device (HWn) at step 528 by retrieving the stored hardware context and state information for the selected hardware device. At the destination-side hardware driver 506, control logic processes the received hardware context and state information at step 530 by converting the information to the required destination format for the target or destination hardware device (HWn) 507. In response, the context for the selected hardware device (HWn) 504 is re-established at step 532. Through an iterative process where control logic at the host 501 decrements the counter n=n−1 at step 536 upon detecting that the context for the first hardware device has not been re-established (negative outcome to detection step 534), the processing steps 525-532 are repeated until all hardware devices have been processed (affirmative outcome to detection step 534), at which point the hardware migration process ends (step 538). In this way, the migration method 500 sequentially cycles through the list of registered hardware devices 504 being migrated to bring online the application-relevant components of the hardware state at the destination-side server machine through reverse steps from those used at the source-side server.

Figure 6:
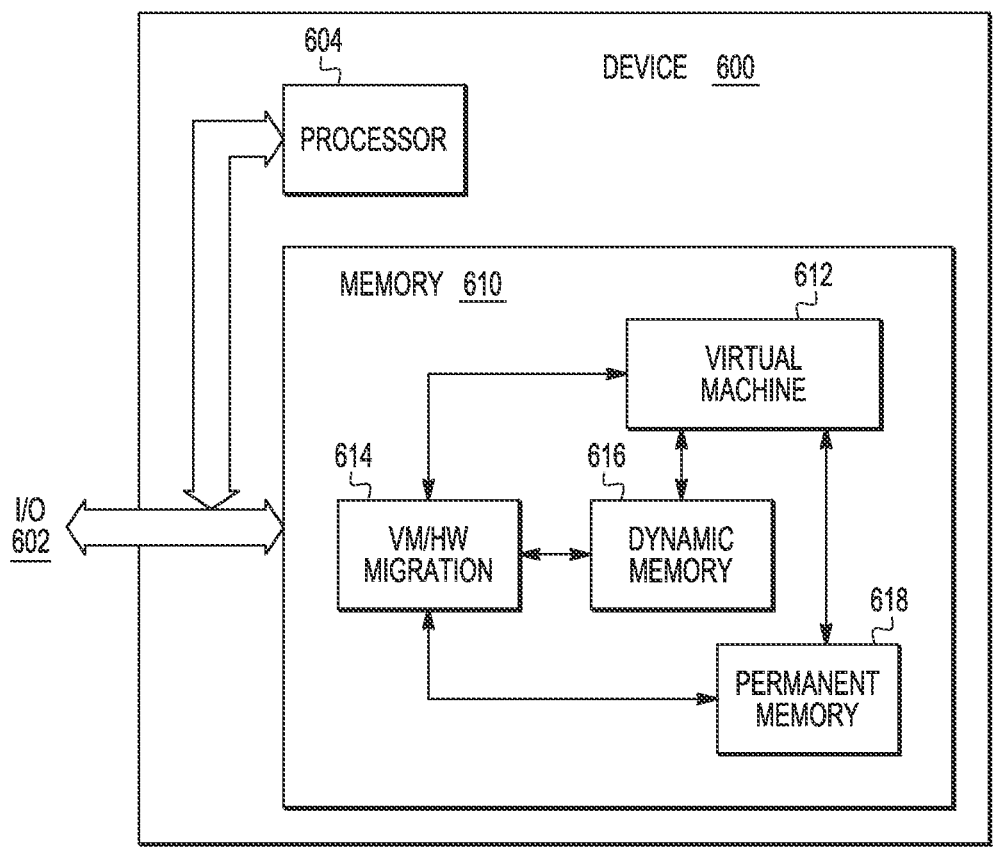
FIG. 6 illustrates a simplified block diagram of a computer device in accordance with selected embodiments of the present disclosure.

FIG. 6 illustrates a simplified block diagram of a computer device in accordance with selected embodiments of the present disclosure. The device 602 has a processor 604 and a memory 610 connected together across an I/O bus 602. Memory 610 may be organized using any desired structure and memory type, and may include one or more levels of memory. The I/O bus 602 is bi-directionally coupled to processor 604 and memory 610 which are also bi-directionally coupled. In the illustrated form, memory 610 stores a VM/HW migration module 614, a Virtual Machine 612, a Dynamic Memory 616, and a permanent memory 618.

In operation, the processor executes predetermined instructions. A first portion of memory 610 is coupled to processor 604 for providing instructions and data to the processor. In one form, the first portion of memory 610 is the virtual machine 612 and the second portion of the memory is the VM/HW migration module 614. Memory 610 contains instructions which, when executed by the processor 604, cause the device 610 to migrate a hardware accelerator machine during virtual machine migration from a source platform to a destination platform. A first set of instructions stored in memory 610 are executed by the processor 604 to identify a first accelerator hardware machine used by the virtual machine 612 in a source hypervisor on the source platform. A second set of instructions stored in memory 610 are executed by the processor 604 to retrieve accelerator state information from the first accelerator hardware machine using a first accelerator driver associated with the first accelerator hardware machine. A third set of instructions stored in memory 610 are executed by the processor 604 to transfer the accelerator state information to a target hypervisor on the destination platform during migration of the first virtual machine from the source platform to the destination platform. A fourth set of instructions stored in memory 610 are executed by the processor 604 to re-establish the accelerator state information at a second accelerator hardware machine on the destination platform using a second accelerator driver associated with the second accelerator hardware machine. A fifth set of instructions stored in memory 610 are executed by the processor 604 to migrate the virtual machine 612 to the target hypervisor on a target platform where the migrated virtual machine is activated at the target hypervisor. During the migration of the first accelerator hardware machine and virtual machine, the dynamic memory 616 and/or permanent memory 618 may be used to store and transfer context state information for the VM and hardware being migrated.

By now it should be appreciated that there is provided herein a software-triggered method and apparatus for migrating a hardware accelerator machine during virtual machine migration from a source platform to a destination platform hardware machines using a defined handshake protocol at a hardware driver to capture context and state information from an associated hardware device being migrated. In the disclosed methodology, a first accelerator hardware machine is identified that is used by a first virtual machine in a source hypervisor on the source platform. In selected embodiments, the first accelerator hardware machine is identified by acquiring a list of one or more registered hardware accelerator machines associated with the first virtual machine in the source hypervisor on the source platform. In such embodiments, the first accelerator driver may register with the source hypervisor upon initialization of the first accelerator driver at the source platform.

In addition, accelerator state information is retrieved from the first accelerator hardware machine using a first accelerator driver associated with the first accelerator hardware machine. In selected embodiments, the accelerator state information is retrieved by reading accelerator state information from the first accelerator hardware machine using the first accelerator driver associated with the first accelerator hardware machine, and storing the accelerator state information from the first accelerator hardware machine in memory in an architecture-neutral format. After retrieving the accelerator state information from the first accelerator hardware machine, a first additional accelerator hardware machine is identified that is used by the first virtual machine in the source hypervisor on the source platform, and additional accelerator state information may be retrieved from the first additional accelerator hardware machine using a first additional accelerator driver associated with the first additional accelerator hardware machine before transferring the accelerator state information to the target hypervisor on the destination platform. Thereafter, the accelerator state information is transferred to a target hypervisor on the destination platform during migration of the first virtual machine from the source platform to the destination platform. At a second accelerator hardware machine on the destination platform, the accelerator state information is re-established using a second accelerator driver associated with the second accelerator hardware machine. In selected embodiments, the accelerator state information is re-established at the second accelerator hardware machine by writing the accelerator state information to a memory associated with the second accelerator hardware machine. Finally, the first virtual machine is migrated to the target hypervisor on the destination platform, and the first virtual machine is activated in the target hypervisor. During migration of the first virtual machine from the source platform to the destination platform, the additional accelerator state information may be transferred to the target hypervisor on the destination platform, and the first additional accelerator state information may be re-established at a second additional accelerator hardware machine on the destination platform using a second additional accelerator driver associated with the second additional accelerator hardware machine. In selected embodiments, the first additional accelerator state information is re-established at the second additional accelerator hardware machine on the destination platform prior to re-establishing the accelerator state information at the second accelerator hardware machine on the destination platform.

In another form, there is provided a computer program product for migrating a hardware accelerator machine during virtual machine migration from a source platform to a destination platform. As disclosed, the computer program product includes one or more computer-readable tangible storage devices for storing program instructions. The stored program instructions are executed to identify a first accelerator hardware machine used by a first virtual machine in a source hypervisor on the source platform. In selected embodiments, the stored program instructions to identify the first accelerator hardware machine are configurable for execution by a processor to acquire a list of one or more registered hardware accelerator machines associated with the first virtual machine in the source hypervisor on the source platform. The stored program instructions may also be executed to register the first accelerator driver with the source hypervisor upon initialization of the first accelerator driver at the source platform. The stored program instructions are also executed to retrieve accelerator state information from the first accelerator hardware machine using a first accelerator driver associated with the first accelerator hardware machine. In selected embodiments, the stored program instructions to retrieve accelerator state information are configurable for execution by a processor to read accelerator state information from the first accelerator hardware machine using the first accelerator driver associated with the first accelerator hardware machine, and to store the accelerator state information from the first accelerator hardware machine in memory in an architecture-neutral format. The stored program instructions are also executed to transfer the accelerator state information to a target hypervisor on the destination platform during migration of the first virtual machine from the source platform to the destination platform. The stored program instructions are also conveyed from the source platform to the destination platform and executed to migrate the first virtual machine to the destination platform and to a re-establish the accelerator state information at a second accelerator hardware machine on the destination platform using a second accelerator driver associated with the second accelerator hardware machine. In selected embodiments, there may also be stored program instructions to identify a first additional accelerator hardware machine used by the first virtual machine in the source hypervisor on the source platform after retrieving accelerator state information from the first accelerator hardware machine, and to retrieve additional accelerator state information from the first additional accelerator hardware machine using a first additional accelerator driver associated with the first additional accelerator hardware machine before transferring the accelerator state information to the target hypervisor on the destination platform. In such embodiments, the stored program instructions may be executed to transfer the additional accelerator state information to the target hypervisor on the destination platform during transfer of the accelerator state information to the target hypervisor on the destination platform. There may also be stored program instructions conveyed from the source platform to the destination platform to re-establish the first additional accelerator state information at a second additional accelerator hardware machine on the destination platform using a second additional accelerator driver associated with the second additional accelerator hardware machine.

In another form, there is provided a system having a source hypervisor, a target hypervisor, and a set of instructions which are stored in memory and executed by one or more processors coupled to the memory to migrate a virtual machine from the source hypervisor to the target hypervisor. As configured, the set of instructions are executable to identify a list of one or more registered accelerator units associated with a first virtual machine, where the list comprises a first accelerator unit used by the first virtual machine; retrieve accelerator state information from the first accelerator unit using a first accelerator driver associated with the first accelerator unit to read accelerator state information from the first accelerator unit using the first accelerator driver and to transform and store the accelerator state information from the first accelerator unit in memory in an architecture-neutral format; transfer the accelerator state information to a target hypervisor on the destination platform during migration of the first virtual machine from the source platform to the destination platform; re-establish the accelerator state information at a second accelerator unit on the destination platform using a second accelerator driver associated with the second accelerator unit; migrate the first virtual machine to the target hypervisor on a target platform; and activate the first virtual machine in the target hypervisor.

In addition, the set of instructions may be executed to cause the system to identify a first additional accelerator unit used by the first virtual machine in the source hypervisor on the source platform after retrieving accelerator state information from the first accelerator unit; and retrieve additional accelerator state information from the first additional accelerator unit using a first additional accelerator driver associated with the first additional accelerator unit before transferring the accelerator state information to the target hypervisor on the destination platform. In selected embodiments, the first accelerator unit is an accelerator hardware machine, and the second accelerator unit is an accelerator hardware machine. In other embodiments, the first accelerator unit is an accelerator hardware machine, and the second accelerator unit is an accelerator software module. In yet other embodiments, the first accelerator unit is an accelerator software module, and the second accelerator unit is an accelerator hardware machine.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and flow charts illustrating design and operational details of server machines for hosting virtual machines and associated hardware devices without including every device feature or aspect in order to avoid limiting or obscuring the present invention. Such descriptions and representations are used by those skilled in the art to describe and convey the substance of their work to others skilled in the art, and the omitted details which are well known are not considered necessary to teach one skilled in the art of how to make or use the present invention. Some portions of the detailed descriptions provided herein are also presented in terms of algorithms and instructions that operate on data that is stored in a computer memory. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of hardware or a computer system or a similar electronic computing device, that manipulates and transforms data represented as physical (electronic) quantities within registers and memories into other data similarly represented as physical quantities within the memories or registers or other such information storage, transmission or display devices.

Although the described exemplary embodiments disclosed herein are directed to various software-triggered machine migration computer products, computing devices, and methodologies for migrating a dedicated hardware device used by a virtual machine to a new destination device, the present invention is not necessarily limited to the example embodiments which illustrate inventive aspects of the present invention that are applicable to a wide variety of information processing systems and circuits. Thus, the particular embodiments disclosed above are illustrative only and should not be taken as limitations upon the present invention, as the invention may be modified and practiced in different but equivalent manners apparent to those skilled in the art having the benefit of the teachings herein. For example, although FIG. 1 and the discussion thereof describe an exemplary server device architecture, this exemplary architecture is presented merely to provide a useful reference in discussing various aspects of the invention, and is not intended to be limiting so that persons of skill in the art will understand that the principles taught herein apply to other types of devices. For example, selected embodiments may implement the illustrated elements of the server SV1 101 or server SV2 111 on a single integrated circuit or within a single device. Alternatively, system 100 may include any number of separate integrated circuits or separate devices interconnected with each other. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, the term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an."

The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for migrating a hardware accelerator machine during virtual machine migration from a source platform to a destination platform, comprising:
    identifying a first hardware accelerator machine used by a first virtual machine in a source hypervisor on the source platform;
    retrieving hardware state information from the first hardware accelerator machine using a first hardware driver associated with the first hardware accelerator machine;
    migrating the first hardware accelerator machine from the source platform to the destination platform by transferring the hardware state information for the first hardware accelerator machine to a target hypervisor on the destination platform during virtual machine migration of the first virtual machine from the source platform to the destination platform;
    re-establishing the hardware state information at a second hardware accelerator machine on the destination platform using a second hardware driver associated with the second hardware accelerator machine;
    migrating the first virtual machine to the target hypervisor on the destination platform; and
    activating the first virtual machine in the target hypervisor.

2. The method of claim 1, identifying the first hardware accelerator machine comprises acquiring a list of one or more registered hardware accelerator machines associated with the first virtual machine in the source hypervisor on the source platform.

3. The method of claim 2, further comprising registering the first hardware driver with the source hypervisor upon initialization of the first hardware driver at the source platform.

4. The method of claim 1, where retrieving hardware state information from the first hardware accelerator machine comprises:
    reading hardware state information from the first hardware accelerator machine using the first hardware driver associated with the first hardware accelerator machine; and
    storing the hardware state information from the first hardware accelerator machine in memory.

5. The method of claim 4, where storing the hardware state information comprises storing the hardware state information in memory in an architecture-neutral format.

6. The method of claim 1, further comprising:
    identifying a first additional hardware accelerator machine used by the first virtual machine in the source hypervisor on the source platform after retrieving hardware state information from the first hardware accelerator machine; and
    retrieving additional hardware state information from the first additional hardware accelerator machine using a first additional hardware driver associated with the first additional hardware accelerator machine before transferring the hardware state information to the target hypervisor on the destination platform.

7. The method of claim 6, further comprising:
    transferring the additional hardware state information to the target hypervisor on the destination platform during migration of the first virtual machine from the source platform to the destination platform; and
    re-establishing the first additional hardware state information at a second additional hardware accelerator machine on the destination platform using a second additional hardware driver associated with the second additional hardware accelerator machine.

8. The method of claim 7, where the first additional hardware state information is re-established at the second additional hardware accelerator machine on the destination platform prior to re-establishing the hardware state information at the second hardware accelerator machine on the destination platform.

9. The method of claim 1, where re-establishing the hardware state information at the second hardware accelerator machine comprises writing the hardware state information to a memory associated with the second hardware machine.

10. A computer program product for migrating a hardware accelerator machine during virtual machine migration from a source platform to a destination platform, the computer program product comprising:
    one or more computer-readable, non-transitory storage devices;
    program instructions, stored on at least one of the one or more storage devices, to identify a first accelerator hardware machine used by a first virtual machine in a source hypervisor on the source platform;
    program instructions, stored on at least one of the one or more storage devices, to retrieve accelerator state information from the first accelerator hardware machine using a first accelerator driver associated with the first accelerator hardware machine;
    program instructions, stored on at least one of the one or more storage devices, to migrate the first accelerator hardware machine from the source platform to the destination platform by transferring the accelerator state information for the first accelerator hardware machine to a target hypervisor on the destination platform during virtual machine migration of the first virtual machine from the source platform to the destination platform; and
    program instructions, stored on at least one of the one or more storage devices and conveyed from the source platform to the destination platform, to migrate the first virtual machine to the destination platform, to re-establish the accelerator state information at a second accelerator hardware machine on the destination platform using a second accelerator driver associated with the second accelerator hardware machine, and to activate the first virtual machine in the target hypervisor.

11. The computer program product of claim 10, where the program instructions to identify the first accelerator hardware machine are configurable for execution by a processor to acquire a list of one or more registered hardware accelerator machines associated with the first virtual machine in the source hypervisor on the source platform.

12. The computer program product of claim 10, further comprising program instructions, stored on at least one of the one or more storage devices, to register the first accelerator driver with the source hypervisor upon initialization of the first accelerator driver at the source platform.

13. The computer program product of claim 10, where the program instructions to retrieve accelerator state information are configurable for execution by a processor to read accelerator state information from the first accelerator hardware machine using the first accelerator driver associated with the first accelerator hardware machine, and to store the accelerator state information from the first accelerator hardware machine in memory.

14. The computer program product of claim 10, where the program instructions to retrieve accelerator state information are configurable for execution by a processor to store the accelerator state information in memory in an architecture-neutral format.

15. The computer program product of claim 10, further comprising program instructions, stored on at least one of the one or more storage devices, to:
identify a first additional accelerator hardware machine used by the first virtual machine in the source hypervisor on the source platform after retrieving accelerator state information from the first accelerator hardware machine; and
retrieve additional accelerator state information from the first additional accelerator hardware machine using a first additional accelerator driver associated with the first additional accelerator hardware machine before transferring the accelerator state information to the target hypervisor on the destination platform.

16. The computer program product of claim 15, further comprising program instructions, stored on at least one of the one or more storage devices, to transfer the additional accelerator state information to the target hypervisor on the destination platform during transfer of the accelerator state information to the target hypervisor on the destination platform.

17. The computer program product of claim 16, further comprising program instructions, stored on at least one of the one or more storage devices and conveyed from the source platform to the destination platform, to re-establish the first additional accelerator state information at a second additional accelerator hardware machine on the destination platform using a second additional accelerator driver associated with the second additional accelerator hardware machine.

18. The computer program product of claim 17, where the first additional accelerator state information is re-established at the second additional accelerator hardware machine on the destination platform prior to re-establishing the accelerator state information at the second accelerator hardware machine on the destination platform.

19. A system for migrating a hardware accelerator unit during virtual machine migration, comprising:
a source hypervisor stored in a first memory at a source platform;
a target hypervisor at a destination platform; and
a set of instructions executable at either or both the source hypervisor and target hypervisor to:
identify a list of one or more registered hardware accelerator units associated with a first virtual machine controlled by the source hypervisor, where the list comprises a first hardware accelerator unit used by the first virtual machine;
retrieve accelerator state information from the first hardware accelerator unit using a first accelerator driver associated with the first hardware accelerator unit to read accelerator state information from the first hardware accelerator unit using the first accelerator driver and to transform and store the accelerator state information from the first hardware accelerator unit in memory in an architecture-neutral format;
migrating the first hardware accelerator unit from the source platform to the destination platform by transferring the accelerator state information to the target hypervisor on the destination platform during virtual migration of the first virtual machine from the source platform to the destination platform;
re-establish the accelerator state information at a second accelerator unit on the destination platform using a second accelerator driver associated with the second accelerator unit;
migrate the first virtual machine to the target hypervisor on the destination platform; and
activate the first virtual machine in the target hypervisor.

20. The system of claim 19, wherein the set of instructions are executable at either or both the source hypervisor and target hypervisor to:
identify a first additional hardware accelerator unit used by the first virtual machine controlled by the source hypervisor on the source platform after retrieving accelerator state information from the first hardware accelerator unit; and
retrieve additional accelerator state information from the first additional hardware accelerator unit using a first additional accelerator driver associated with the first additional hardware accelerator unit before transferring the accelerator state information to the target hypervisor on the destination platform.

21. The system of claim 19, where the first hardware accelerator unit comprises a first accelerator hardware machine, and where the second accelerator unit comprises a second accelerator hardware machine.

22. The system of claim 19, where the first hardware accelerator unit comprises a first accelerator hardware machine, and where the second accelerator unit comprises an accelerator software module.

* * * * *